United States Patent Office 3,395,276
Patented July 30, 1968

3,395,276
CONSTRUCTION OF RAIL FROGS AND
METHODS OF MANUFACTURE
Wilhelm Munch, Minden, and Ernst Von Hayn, and
Emil Muller, Butzbach, Germany, assignors to
Pintsch, Bamag Aktiengesellschaft, Berlin, Germany
Filed Feb. 7, 1967, Ser. No. 614,507
5 Claims. (Cl. 246—468)

ABSTRACT OF THE DISCLOSURE

A frog for a rail crossing composed of a midblock and wing rails which are welded together. The midblock and wing rails are formed from full section rail stock and are so machined along facing lateral surfaces as to be joined in spaced relation by a plurality of electrical welds without the interposition of spacers, the spaced relation of the lateral surfaces being such as to provide grooves of prescribed width between the rails for the passage of wheels.

Brief summary of the invention

The invention relates to rail crossings of train tracks and in particular to an element of such rail crossing generally referred to as a "frog." The invention is particularly concerned with the manufacture of such frogs for rail switches and crossings and the purpose thereof is to provide a method for producing these parts which are exposed to the greatest stresses, such that they will satisfy the needs of increasing speeds and increasing loads of rail traffic. In this regard, the frogs are required not only to have strength properties of a high standard; they are also required to possess an elasticity commensurate with that of the remaining track or switch structure, so that when traversed at high speed they will not adversely affect the running of the rolling stock, particularly as regards the comfort of passengers riding in passenger trains.

Comparatively good strength properties are obtained in frogs constructed as a one-piece block, such as are produced as castings, notably from austenitic manganese steel, or from forgings. However, such frogs are comparatively inelastic and therefore they ro not meet the above-mentioned requirement that the line of track be continuously of as uniform elasticity as possible.

In this respect, block-welded frogs are superior to the cast or forged types. The preferred method of manufacturing welded frogs according to current practice is to first produce a frog midblock by welding together full section rails or by forging it from one-piece and then joining the midblock to wing-rails by welding, using make-up or spacer pieces to maintain the specified width of groove. The large number of welded joints resulting from this method, however, adversely affects the fatigue strength of the frog.

Although attempts have been made to eliminate the spacer pieces and to replace them with welded material by joining the midblock and wing rail by a fusion or aluminothermic welding process, this does not permit preliminary heat-treating of the mid-block and wing rails and the finished frog disadvantageously has to be heat-treated after the welding is completed. This is subject to practical difficulties considering the size of the frog and does not yield results that are adequate technically.

It has also been proposed to make the midblock of the frog and the wing rails from filled-section rails with the smooth sides of the filled section adjoining throughout the entire length of the assembly and to bolt or weld them together thus as a means of avoiding the use of spacer pieces. One such suggested method of welding provides for the parts of the frog to be joined by plug or slot welds, wherein transverse bores machined clear through the component parts of the frog are filled with weld metal so that the parts of the assembly are held together by a kind of welded bolt. With this method, however, the weld sections are comparatively small at the actual points of connection and the greater part of the length of the continuous filled weld does not contribute to strengthening the connection. This design is therefore not suitable to satisfy the rigorous requirements despite the elaborateness of the construction.

The invention contemplates a different approach and provides that the midblock of the frog, on one hand, and the wing rails, on the other hand, be prefabricated or machined from full section rail stock in such a way that parallel surfaces are arranged facing one another at a distance that still permits them to be welded while maintaining the stipulated widths of groove. The midblock and the wing rails are heat-treated separately for hardening and tempering them on their treads, and the midblock and wing rails are subsequently welded together directly by electrical means at the prescribed distance at a plurality of location sin the upper and lower marginal zones of the parallel surfaces.

As a result of this direct welding at accessible areas of the adjacent full section rails, and in contrast with the familiar type of welded frog, the necessary widths of groove can be obtained without the use of spacer pieces, the expenditure for welding is reduced, the quality of welding is improved, and the transverse stability of the assembly is increased. In addition to the above and in further contrast with the cast and forged types of block, the desired elasticity is obtained as a result of avoiding solid sections over great lengths. Furthermore, it is possible for the heat-treating of the surface to be undertaken prior to welding, because the method of welding employed in this instance does not destroy the heat treatment.

The areas that are to be joined by electric welding at the upper and lower edges of the parallel surfaces of the midblock and wing rails may be selected to be in longitudinal alignment or staggered, the latter arrangement providing for simplification of welding and for testing the welds.

Detailed description of the invention

Figure 1:
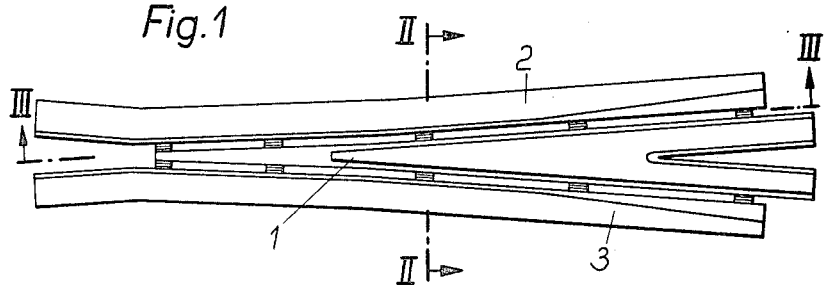
FIGURE 1 is a plan view of a frog.
Figure 2:
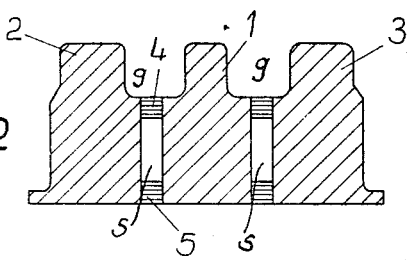
FIGURE 2 is an enlarged cross-sectional view on the line II—II of FIG. 1.

As seen in FIGS. 1 and 2, the frog is comprised of a midblock 1 and wing rails 2, 3. The midblock and wing rails are prefabricated or machined from full section rail stock. These sections are machined on their lateral facing surfaces and are arranged such that these surfaces are smooth and parallel to one another at a prescribed spacing $s$ such that the necessary width of grooves $g$ for the passage of the wheels is maintained. The spacing is sufficiently small to enable electrical welding of the midblock to the wing rails along the facing surfaces without the interposition of make-up or spacer pieces.

Figure 3:
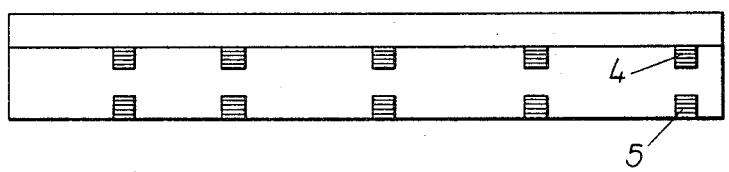
FIGURE 3 is a longitudinal section on the line III—III of FIG. 1, showing the opposed arrangement of the welded joints.
Figure 4:
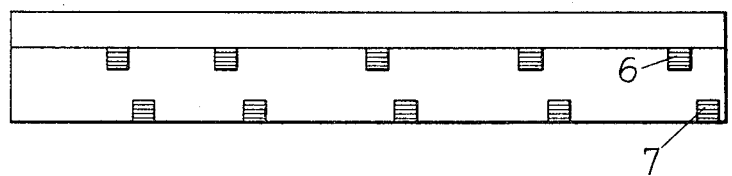
FIGURE 4 is a longitudinal section of another embodiment with a staggered arrangement of the welded joints.

The welded joints consist of a multiple number of small welds disposed along the upper and lower marginal areas of the parallel surfaces and arranged either in aligned pairs as shown at 4, 5 in FIG. 3 or in staggered pairs as shown at 6, 7 in FIG. 4.

The midblock 1 and wing rails 2, 3 are separately heat-treated prior to their assembly by welding, in order to harden and temper them on their treads on which the wheels run. The electrical welding operation which is effected on the heat-treated midblock 1 and wing rails 2, 3 does not adversely affect the hardness or temper of these members.

What is claimed is:

1. A frog for a rail crossing comprising a midblock and wing rails respectively constituted of rail sections, said wing rails and midblock having lateral facing surfaces which are spaced apart a predetermined distance at which said rail sections of said wing rails and midblock define grooves of prescribed width, said lateral facing surfaces of the midblock and wing rails being coextensive and planar in the entire region below said groove to define rectangular spaces between said surfaces, and weld means joining the lateral facing surfaces of the midblock and wing rails, the spacing of said surfaces being sufficiently small to enable the weld means to be directly between said facing surfaces without the interposition of spacers.

2. A frog as claimed in claim 1 wherein said weld means is constituted by a plurality of individual spaced welds arranged in two longitudinal rows.

3. A frog as claimed in claim 2 wherein the welds in said rows are staggered in the longitudinal direction.

4. A frog as claimed in claim 2 wherein the welds in said rows are in longitudinal alignment.

5. A frog as claimed in claim 2 wherein the rows of welds are provided respectively at the upper and lower margins of said lateral facing surfaces.

References Cited

UNITED STATES PATENTS

| 1,774,263 | 8/1930 | Gillispie | 246—464 |
| 1,814,466 | 7/1931 | Bergundthal | 246—464 |

FOREIGN PATENTS

| 1,140,218 | 11/1962 | Germany. |
| 1,156,097 | 10/1963 | Germany. |
| 328,404 | 8/1935 | Italy. |

ARTHUR L. LA POINT, *Primary Examiner.*

R. A. BERTSCH, *Assistant Examiner.*